United States Patent [19]

Chin

[11] Patent Number: 5,490,283
[45] Date of Patent: Feb. 6, 1996

[54] ADAPTER WITH FIFO AND BUFFERS FOR INTERFACING A HANDHELD SCANNER TO THE PARALLEL PRINTER PORT OF A PORTABLE COMPUTER

[75] Inventor: Robert Chin, Taipei, Taiwan

[73] Assignee: Ultima Electronics Corporation, Taipei, Taiwan

[21] Appl. No.: 295,355

[22] Filed: Aug. 24, 1994

Related U.S. Application Data

[63] Continuation of Ser. No. 946,745, Sep. 16, 1992, abandoned.

[51] Int. Cl.$^6$ ........................................ G06F 3/00
[52] U.S. Cl. .................... 395/893; 395/500; 364/DIG. 1; 364/237.83; 364/239.2; 364/241.9
[58] Field of Search ................... 235/472; 369/709.01, 369/709.11; 395/106, 114, 250, 325, 275, 500

[56] References Cited

U.S. PATENT DOCUMENTS

| | | | |
|---|---|---|---|
| 4,062,059 | 12/1977 | Suzuki et al. | 395/250 |
| 4,497,041 | 1/1985 | Braun | 395/275 |
| 4,635,222 | 1/1987 | Tokui | 395/114 |
| 4,703,450 | 10/1987 | Sueyoshi et al. | 395/275 |
| 4,750,150 | 6/1988 | Weppler | 395/275 |
| 4,861,972 | 8/1989 | Elliot et al. | 235/462 |
| 4,891,768 | 1/1990 | Willems et al. | 395/164 |
| 4,922,437 | 5/1990 | Sakata et al. | 364/514 |
| 4,989,163 | 1/1991 | Kawamata et al. | 395/106 |
| 5,065,005 | 10/1991 | Kaneko et al. | 395/250 |
| 5,090,830 | 2/1992 | Kroeger et al. | 400/719 |
| 5,097,410 | 3/1992 | Hester et al. | 395/250 |
| 5,120,943 | 6/1992 | Benz | 235/375 |
| 5,134,702 | 7/1992 | Charych et al. | 395/500 |
| 5,179,270 | 1/1993 | Taussig et al. | 235/462 |
| 5,184,005 | 2/1993 | Ukai et al. | 235/472 |
| 5,243,602 | 9/1993 | Aragi, Jr. | 371/25.1 |
| 5,261,060 | 11/1993 | Free | 395/325 |
| 5,299,314 | 3/1994 | Gates | 395/200 |
| 5,408,614 | 4/1995 | Thornton et al. | 395/275 |

FOREIGN PATENT DOCUMENTS

| | | | |
|---|---|---|---|
| 4-22664 | 1/1992 | Japan | 395/114 |

OTHER PUBLICATIONS

Webster's Ninth New Collegiate Dictionary, 1990, p. 379.
Damore, K. "Logitech Scanner Doesn't Need Board." InFoWorld, vol. 15, No. 27, p. 29 (Jul. 5, 1993).
Rowell, D. "Conflicting Modem and Software." PC Sources, vol. 2, No. 10, p. 531 (Oct. 1991).
Ehrenman, G. et al. "Quick Graphics on a Budget: 12 Hard Scanners." PC Magazine, vol. 10, No. 19, p. 223 (Nov. 12, 1991).
DeJean, D. "Wedded Bliss: Sharing a Printer With Mr. and Mrs. Bridgeport" PC–Computing, vol. 4, No. 3, p. 40 (Mar. 1991).

*Primary Examiner*—Thomas C. Lee
*Assistant Examiner*—Lance L. Barry
*Attorney, Agent, or Firm*—Christensen O'Connor Johnson & Kindness

[57] ABSTRACT

An adapter system is used to interface a handheld scanner to the parallel printer port of a portable computer and includes a data buffer to receive serial video data from the handheld scanner and to convert the serial video data into parallel video data. A scanner resolution latch receives scanner controller signals from the handheld scanner and provides scanning resolution data to a printer control and status bus of the printer port. A memory unit is used to store the parallel video data from the data buffer and to provide the parallel video data to the printer control and status bus. A memory controller receives the scanner controller signals and generates write signals to the memory unit so as to enable the memory unit to store the parallel video data therein. The memory controller further generates an interrupt signal at the printer control and status bus so as to inform the computer that video data is available when a predetermined quantity of the parallel video data has been stored in the memory unit.

16 Claims, 8 Drawing Sheets

| PARALLEL PRINTER PORT | 1 /STROBE |
| | 2 Data Bit 0 (DB0) |
| | 3 Data Bit 1 (DB1) |
| | 4 Data Bit 2 (DB2) |
| | 5 Data Bit 3 (DB3) |
| | 6 Data Bit 4 (DB4) |
| | 7 Data Bit 5 (DB5) |
| | 8 Data Bit 6 (DB6) |
| | 9 Data Bit 7 (DB7) |
| | 10 /ACK |
| | 11 BUSY |
| | 12 PE |
| | 13 SLCT |
| | 14 /AUTO FEED XT |
| | 15 /ERROR |
| | 16 /INIT |
| | 17 /SCLT IN |
| | 18-25 SIGNAL GRWND |

FIG. 2

ADAPTER WITH FIFO AND BUFFERS FOR INTERFACING A HANDHELD SCANNER TO THE PARALLEL PRINTER PORT OF A PORTABLE COMPUTER

This application is a continuation application based on prior copending application Ser. No. 07/946,745, filed on Sep. 16, 1992, now abandoned.

BACKGROUND OF THE INVENTION

1. Field of the Invention

The invention relates to an adapter system, more particularly to an adapter system for interfacing a handheld scanner to the parallel printer port of a portable computer.

2. Description of the Related Art

Presently, the interface card of a conventional handheld scanner is mounted on the expansion slot of a computer in order to connect electrically the handheld scanner and the computer. A direct memory access technique is employed to permit the handheld scanner to write data into the microcomputer memory. However, because recently developed portable computers, such as notebook computers and laptop computers, are configured to have relatively small sizes, handheld scanners cannot be connected thereto due to the absence of available expansion slots.

In order to permit the connection of a handheld scanner thereto, some portable computers incorporate a special processing circuit which is adapted for use with a specific type of handheld scanner. Thus, not all commercially available handheld scanners can be used with said portable computers.

SUMMARY OF THE INVENTION

Therefore, the objective of the present invention is to provide an adapter system for interfacing a conventional handheld scanner to the parallel printer port of a conventional portable computer without the need for modifying the hardware configuration of the handheld scanner and/or the portable computer.

Accordingly, the adapter system of the present invention is used to interface a handheld scanner to the parallel printer port of a portable computer and comprises:

a data buffer receiving serial video data from the handheld scanner and converting the serial video data into parallel video data;

a scanner resolution latch receiving scanner controller signals from the handheld scanner and providing scanning resolution data to a printer control and status bus of the printer port;

a memory unit for storing the parallel video data from the data buffer and for providing the parallel video data to the printer control and status bus; and a memory controller receiving the scanner controller signals and generating write signals to the memory unit so as to enable the memory unit to store the parallel video data therein, said memory controller further generating an interrupt signal at the printer control and status bus so as to inform the computer that video data is available when a predetermined quantity of the parallel video data has been stored in the memory unit.

BRIEF DESCRIPTION OF THE DRAWINGS

Other features and advantages of the present invention will become apparent in the following detailed description of the preferred embodiment, with reference to the accompanying drawings, of which:

FIG. 2 is a pin diagram of the parallel printer port of a portable computer;

DETAILED DESCRIPTION OF THE PREFERRED EMBODIMENT

Figure 1:
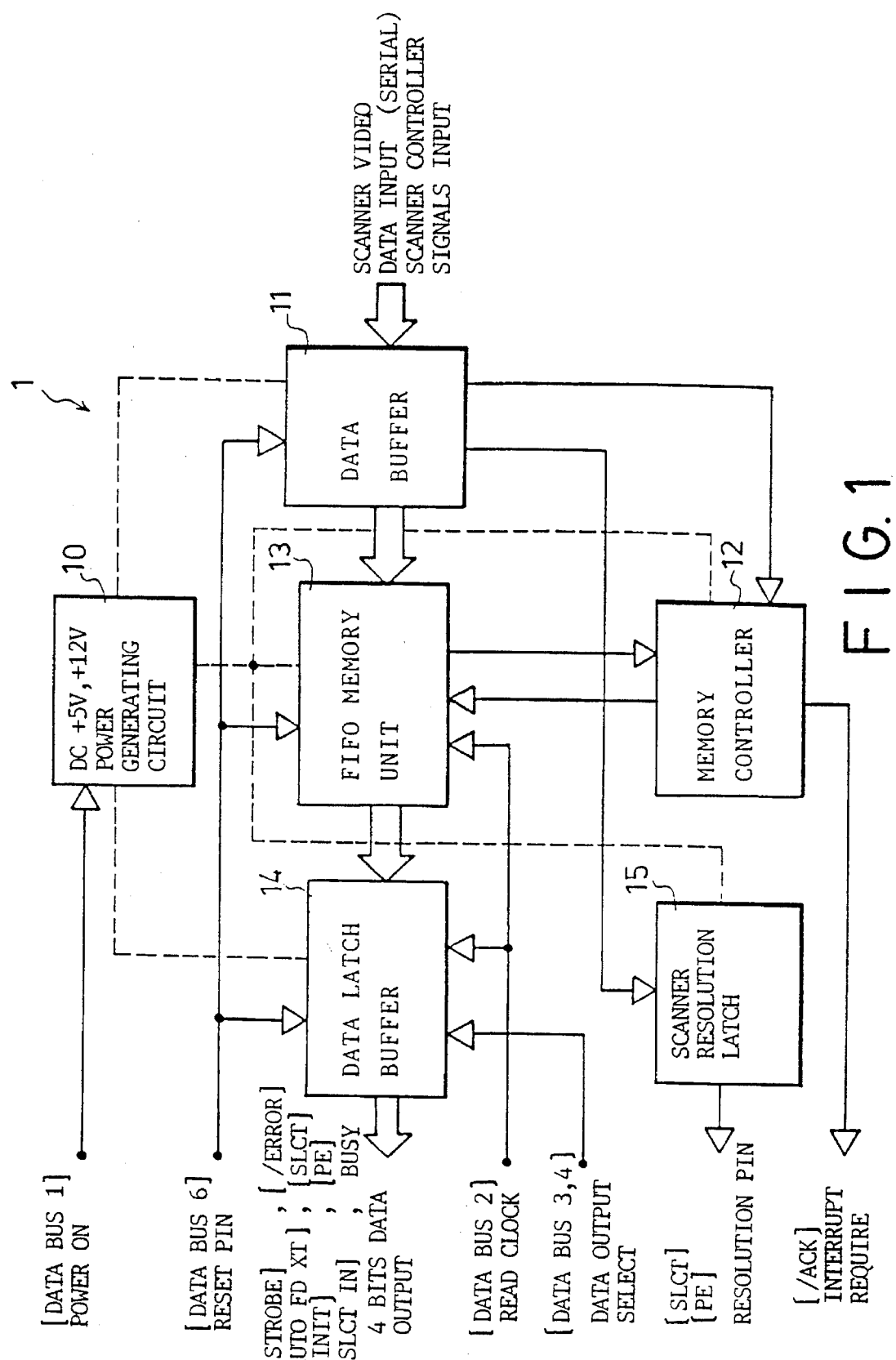
FIG. 1 is a schematic circuit block diagram of the preferred embodiment of an adapter system according to the present invention.

Referring to FIG. 1, the preferred embodiment of an adapter system (1) according to the present invention is used to interface a handheld scanner and the parallel printer port of a portable computer so as to effect data transfer from the handheld scanner to the portable computer. The adapter system (1) comprises a power generating circuit (10), a data buffer (11), a memory controller (12), a first in, first out (FIFO) memory unit (13), a data latch buffer (14) and a scanner resolution latch (15).

The adapter system (1) has a D type connector which is adapted to engage the parallel printer port of the portable computer. FIG. 2 is a pin diagram of the parallel printer port (30). The parallel printer port (30) has twenty-five pins, which pins include a data bus, a printer control bus and a printer status bus. The following is a detailed description of the pins of the parallel printer port (30).

A. The printer data bus (Data bit 0–Data bit 7) permits data transfer from the computer to the computer printer. Data which is to be sent by the computer to the computer printer is initially stored in a data buffer of the former. Since the computer is designed to provide data to the computer printer and not to receive data therefrom, the data buffer is always enabled. The STROBE signal is used to inform the computer printer when data is available thereto.

B. The printer control bus includes the following pins:

SLCT IN=1 indicates to the computer printer that it has been selected.

/INIT=0 is used to activate the computer printer.

AUTO FD XT=1 is used to indicate that the computer printer has printed one line and is prepared to print the next line.

STROBE serves as a data latch signal and is in a high logic state when data is to be retrieved from the data bus.

The signals present at the printer control bus are received from a control output buffer (not shown) of the printer port (30). The control output buffer is an 8-bit latch, and the signals for the printer control bus are present at pins 0 to 3 of the control output buffer.

C. The printer status bus includes the following pins:

/BUSY=0 is used to indicate that the computer printer is busy and is not ready to receive data.

/ACK=0 is used to indicate that the computer printer has successfully received one data byte and is ready to receive the next data byte.

PE=1 is used to indicate that the computer printer has detected the end of a paper sheet.

SLCT=1 is used to indicate that the computer printer was selected.

/ERROR=0 is used to indicate that the computer printer has detected an error condition.

The signals present at the printer status bus are sent to a control input buffer (not shown) of the printer port (30). The control input buffer is an 8-bit latch, and the signals from the printer status bus are present at pins 3 to 7 of the control input buffer.

D. The GROUND pins serve as a common ground between the parallel printer port (30) and the external device.

Figure 3:
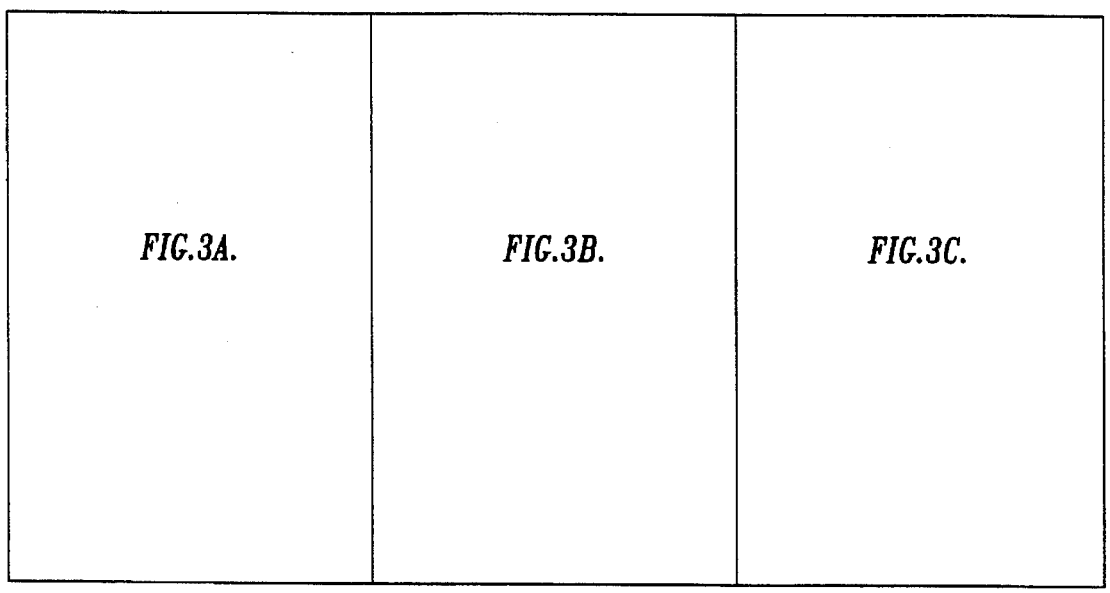
FIGS. 3, 3A, 3B, and 3C are a schematic electrical circuit diagram of the preferred embodiment.
Figure 3A:
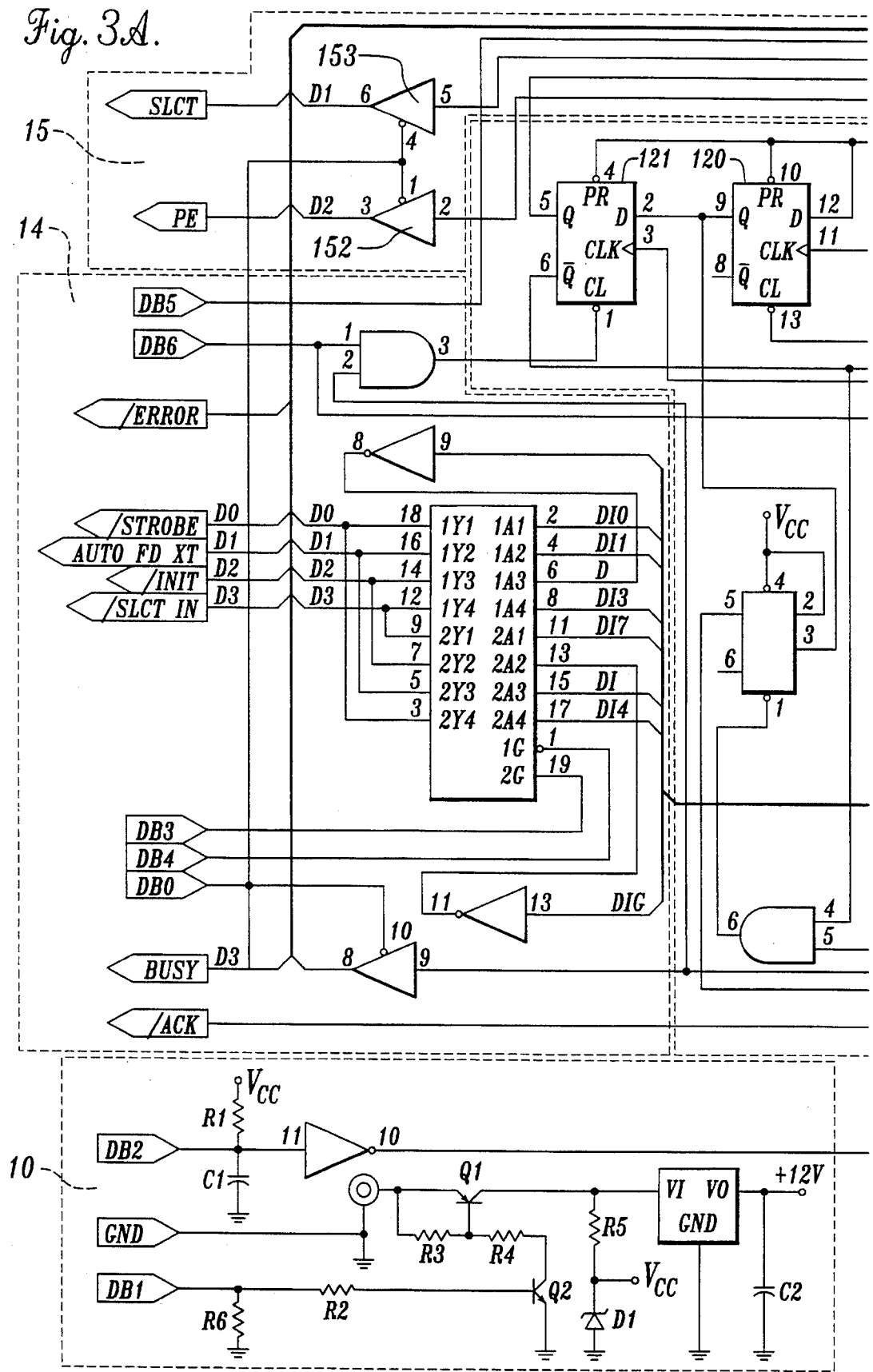
Figure 3B:
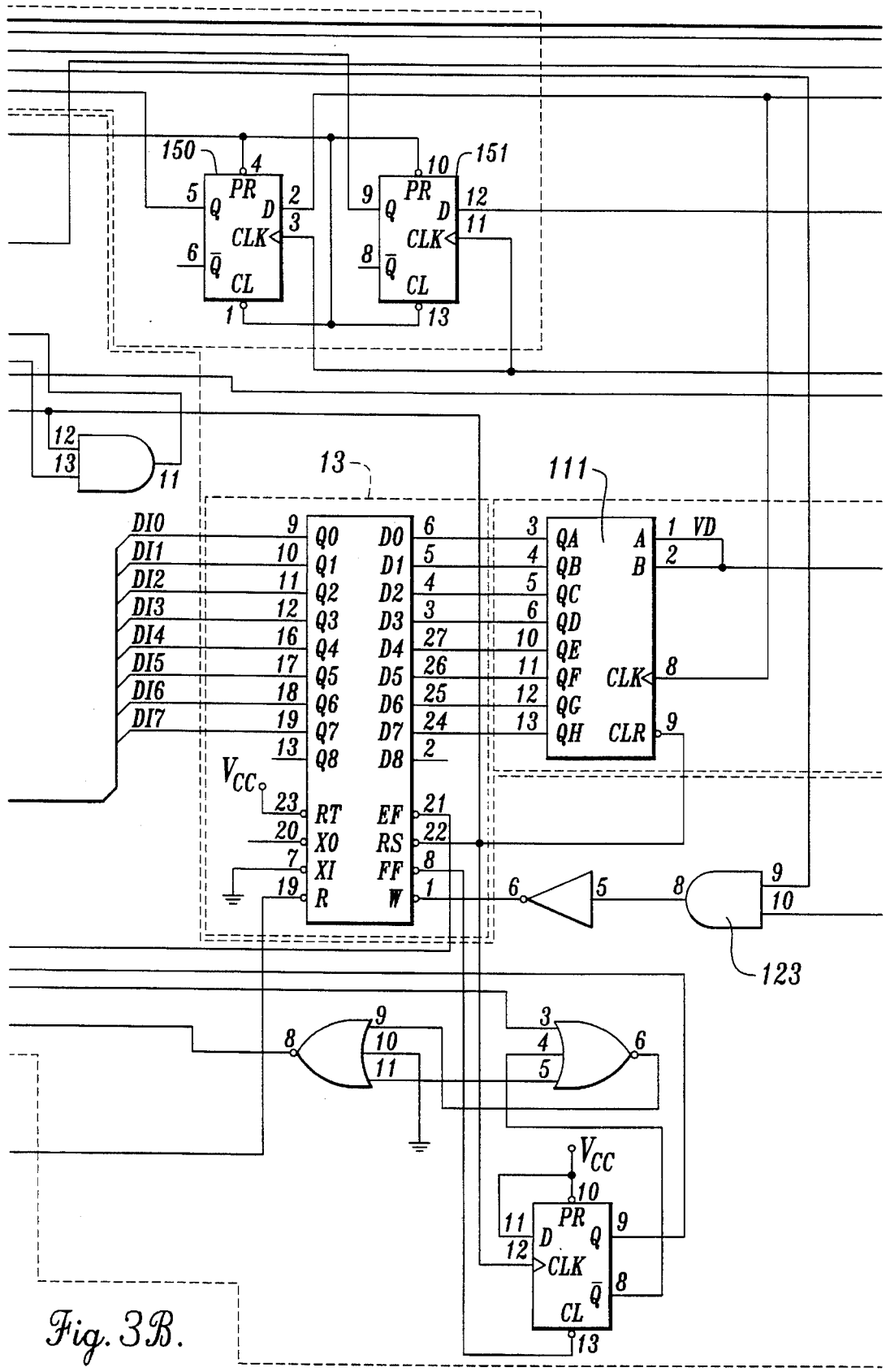
Figure 3C:
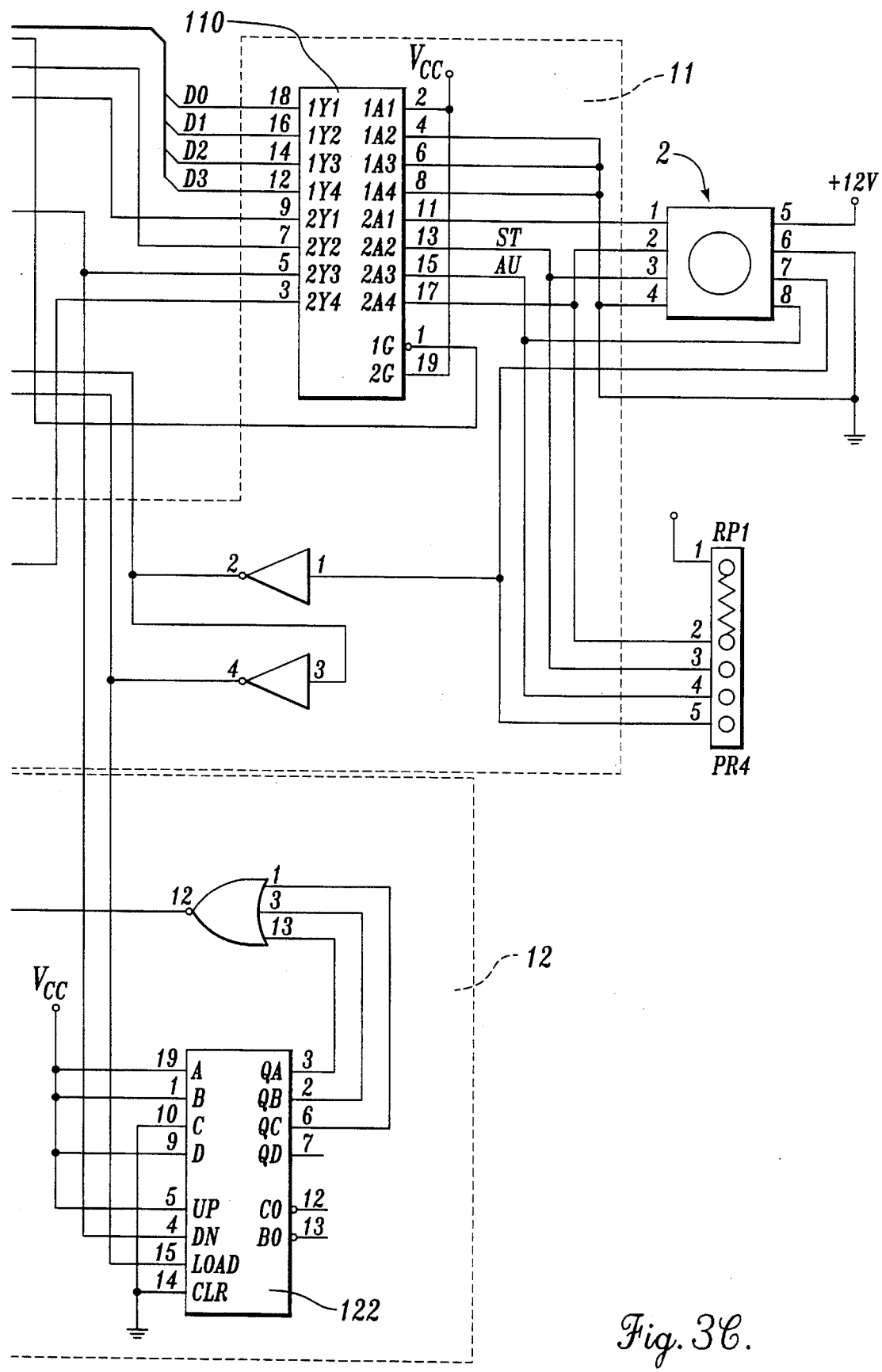

Referring to FIG. 3, the data buffer (11) includes an input buffer (110) and a serial-to-parallel integrated circuit (111). The memory controller (12) comprises a first flip-flop (120), a second flip-flop (121), a counter (122) and a first AND gate (123). The scanner resolution latch (15) includes a third flip-flop (150) and a fourth flip-flop (151).

Figure 6:
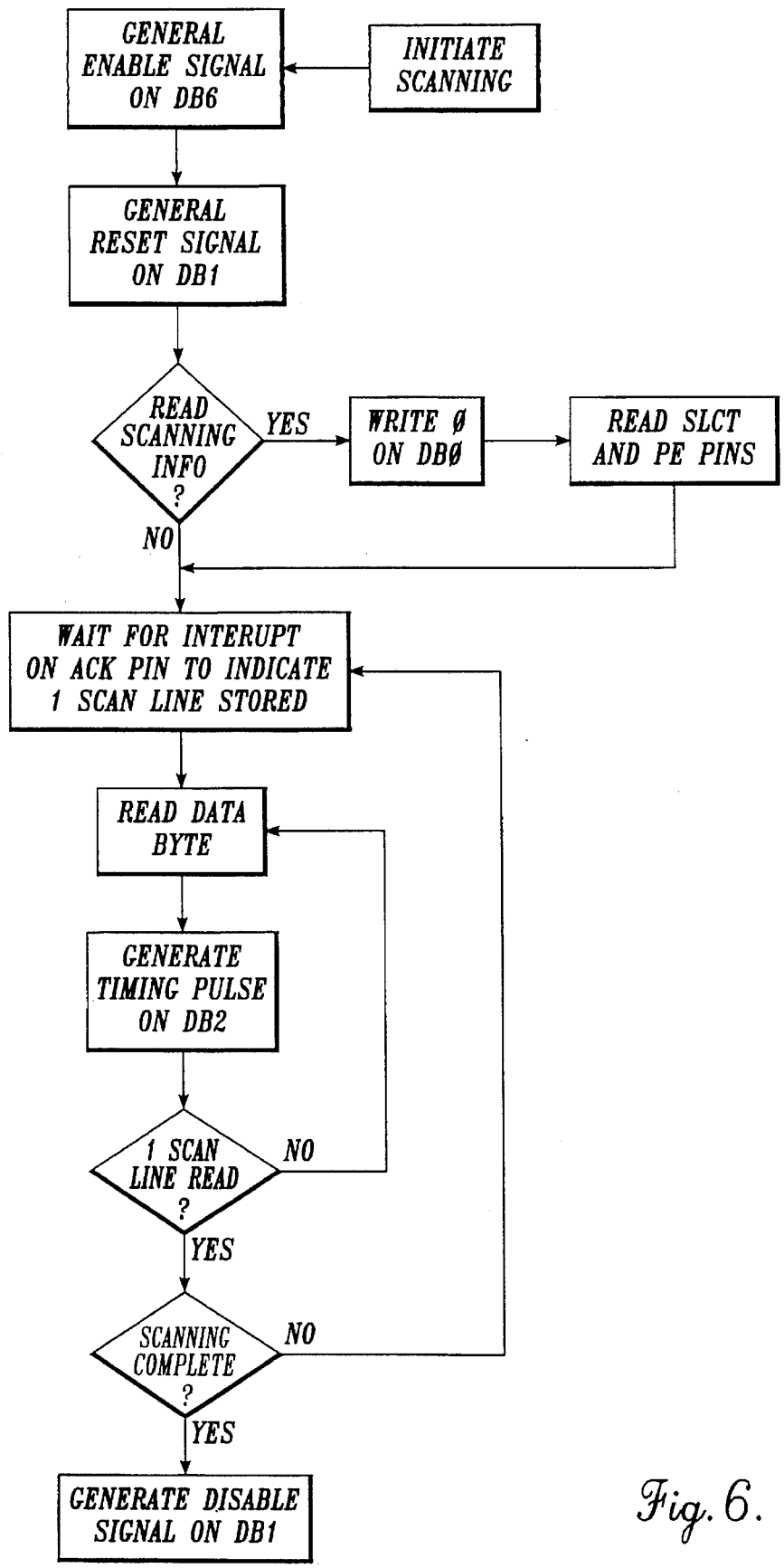
FIG. 6 is a flow chart of a computer program that resides in the portable computer and interfaces with the adapter system.

When the power system is activated, a reset signal is generated at DB6 of the printer port. Note that the adapter system (1) of the present invention incorporates a plurality of memory logic devices. Therefore, it is necessary to execute a reset operation prior to scanning. In the preferred embodiment, the computer system is controlled by a computer program so as to write a logic 1 in DB6 and to write a logic 0 in the same afterwards in order to generate the reset signal. FIG. 6 defines steps of the computer program executed by the computer system. The steps of the computer program are discussed below as the hardware of the adapter system is more fully described.

Referring back to FIG. 3, the adapter system (1) requires an external DC power source which supplies the required operating power to the adapter system (1) and to the handheld scanner (2). In order to conserve electricity and to prolong the useful life of the light emitting unit of the handheld scanner (2), the computer system is controlled by a computer program so as to deactivate the power source when the handheld scanner (2) is not in use and so as to activate the latter only when scanning is to be initiated. In the preferred embodiment, the logic state at DB1 of the printer port is used to control the switching action of a power transistor (Q2) of the power generating circuit (10). The computer program thus controls the computer system to write a logic 1 or a logic 0 at the DB1 pin to control the supply of power to the adapter system (1) and to the handheld scanner (2).

The handheld scanner (2) transmits ST, AR, WG and AU signals when activated. These signals are received by the input buffer (110) of the data buffer (11). The input buffer (110) further receives serial video data (VD) from the handheld scanner (2) and provides the same to the integrated circuit (111) so as to obtain parallel video data.

The ST, AR, WG and AU signals from the input buffer (110) are received by the memory controller (12). The output pin (pin 5) of the second flip-flop (121) changes to a high logic state only after the first flip-flop (120) has received the ST signal and the second flip-flop (121) has received the AR signal. Counting action of the counter (122) of the memory controller (12) is initiated when the handheld scanner (2) is activated. The counter (122) then continuously provides a high logic signal to the first AND gate (123). Upon generation of the high logic signal from the second flip-flop (121), the first AND gate (123) generates a write signal to the FIFO memory unit (13), thereby enabling the latter to store the parallel video data from the integrated circuit (111) therein. The memory controller (12) generates an interrupt signal after one scan line has been stored in the FIFO memory unit (13). The computer system receives the interrupt signal via the ACK pin of the printer port. Note that bit 4 of the control buffer of the printer port should be set to 1 in order to enable the interrupt function of the computer. The operation and configuration of the control buffer of the printer port are beyond the scope of the present invention and will not be detailed herein. However, one can refer to the IBM PC AT technical manual if a detailed description of the operation of the control buffer is desired.

The ST signal from the handheld scanner (2) is sent to the printer port via the ACK pin. Each time a transverse synchronizing signal is generated by the handheld scanner to indicate that a new line of video data is available, the printer port generates an interrupt signal to the computer to interrupt operation of the latter and permit retrieval of the new line of video data.

The output data buffer (not shown) of the printer port is always activated and the contents of the same are provided to the data bus. Video data from the data latch buffer (14) of the adapter system (1) cannot be sent to the data bus of the printer port since the output data buffer is adapted to send and not receive data.

In order to overcome the above problem, the video data is instead sent via the printer status bus or the printer control bus of the printer port. Since only four pins are available for use in each of the status and control buses, an 8-bit video data is divided into two parts with each part being transmitted via the status bus or the control bus.

Pin 2 of the third flip-flop (150) of the scanner resolution latch (15) receives the WG signal from the input buffer (110). Pin 12 of the fourth flip-flop (151) receives the AU signal from the input buffer (110). The AU and WG signals are latched during the rising edge of the horizontal synchronizing signal (AR) of the handheld scanner (2). The outputs of the third and fourth flip-flops (150, 151) are connected to the SLCT and PE pins of the printer port and are used to provide scanning resolution data to the computer. SLCT=PE=0 indicates that a 400 dots per inch (DPI) scanning resolution is in use. SLCT=0 and PE=1 indicates that a 300 DPI scanning resolution is in use. SLCT=1 and PE=0 indicates that a 200 DPI scanning resolution is in use. Finally, SLCT=PE=1 indicates that a 100 DPI scanning resolution is in use.

The outputs of the third and fourth flip-flops (150, 151) are connected to the SLCT and PE pins via tri-state buffers (152, 153). The tri-state buffers (152, 153) are controlled by the logic signals present at the DB0 pin of the printer port. The computer writes a logic 0 at the DB0 pin when it is desired to read the scanning resolution in use. The tri-state buffers (152, 153) are enabled, while the data latch buffer (14) is disabled at this stage.

Figure 4:
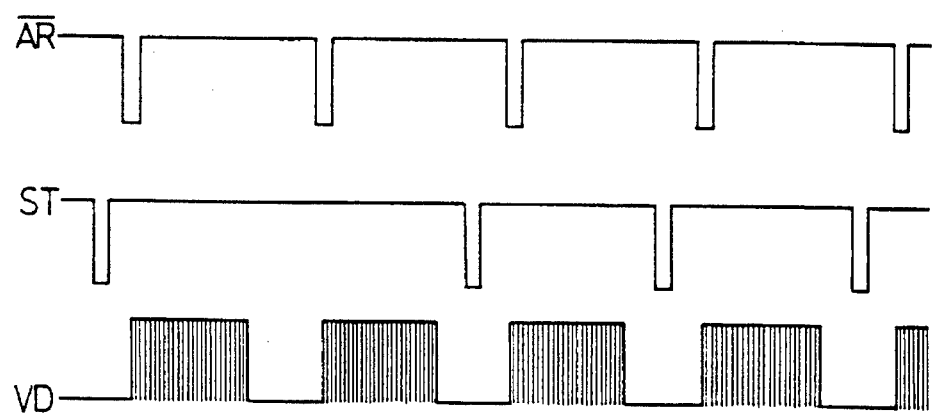
FIG. 4 is a timing diagram which illustrates the AR, ST and VD signals from a handheld scanner.

FIG. 4 is a timing diagram of the AR, ST and VD signals from the handheld scanner (2). The purpose of the signals from the handheld scanner are as follows:

The ST signal is a transverse synchronized scanning signal.

The AR signal is at a low logic state to indicate the start of horizontal scan line.

The WG signal is used to inform a receiver unit that a pixel of data is available. The receiver unit retrieves the pixel of data during the leading edge of the WG signal. The WG signal, along with the AU signal, is also used to indicate which scanning resolution is in use when the AR signal is in a low logic state.

The AU signal is used to inform the receiver unit that a pixel of data has already been sent. The AU signal, along with the WG signal, is also used to indicate which scanning resolution is in use when the AR signal is in a low logic state.

The VD signal consists of the scanned video data and is generated by the photoconverter and decoder circuitry inside the handheld scanner (2). The number of bits which represent each pixel depends upon the type of handheld scanner (2) which is in use. The number of bits may range from 1 (for a black and white handheld scanner) to 24 (for a colored handheld scanner). The receiver unit is burdened with the task of receiving the video data from the handheld scanner and transmits eight bits of video data each time to the computer so as to undergo a decoding process in the latter.

Figure 5:
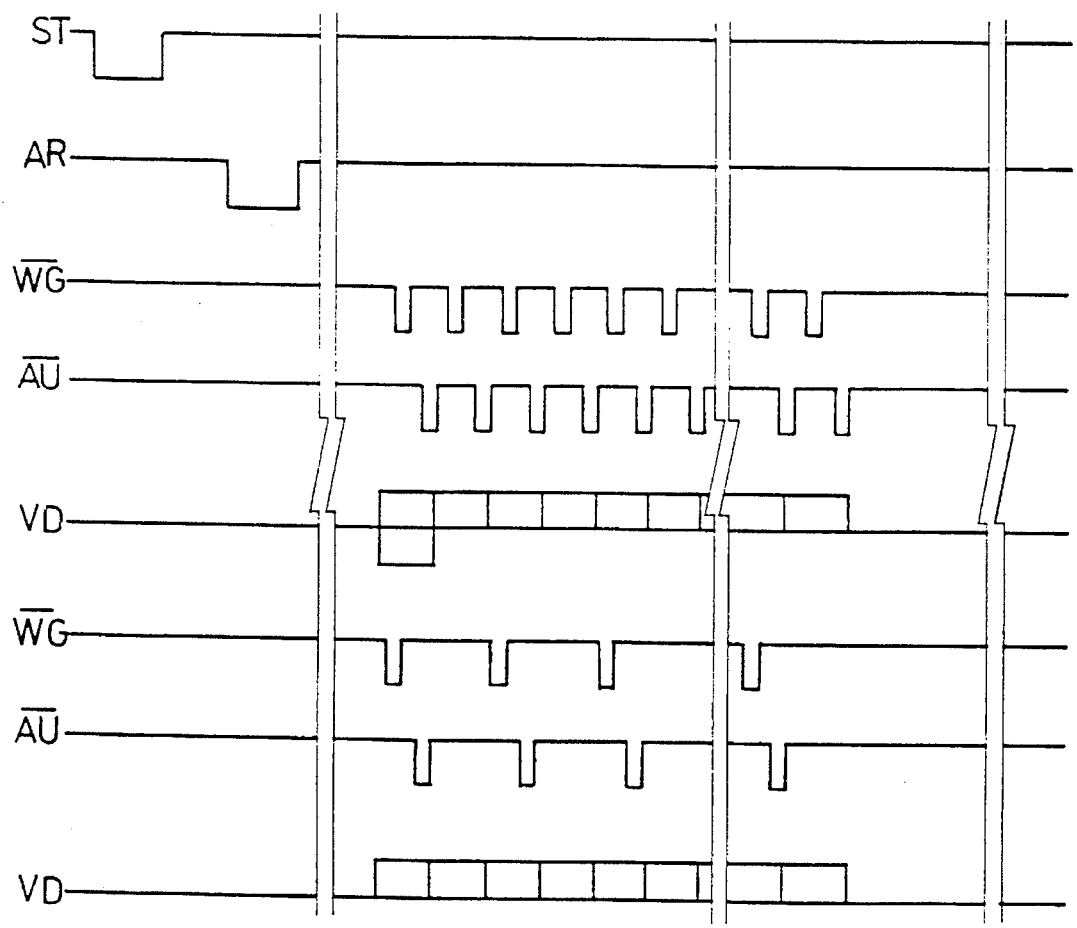
FIG. 5 is a timing diagram which illustrates the WG and AU signals of a handheld scanner when the handheld scanner is operated under different scanning resolution conditions.

Referring once more to FIG. 4, the write signal is received by the FIFO memory unit (13) so as to store the VD signal therein only after the ST and/AR signals have been received by the memory controller (12). FIG. 5 is a timing diagram which illustrates the/WG and /AU signals when the handheld scanner (2) is operating under different scanning resolution conditions.

It is important to note that during the course of operation of the handheld scanner (2), the scanning speed may be greater than the transmission speed at the printer port. The FIFO memory unit (13) is therefore necessary in order to store temporarily data from the handheld scanner (2) prior to retrieval by the computer so as to prevent data loss. Note that other types of memory units, such as a static RAM (SRAM) or a dynamic RAM (DRAM), may be used instead of the FIFO memory unit (13). The memory capacity of the memory unit (13) depends upon the difference in the scanning speed and the transmission speed but should be sufficient to store at least one scan line.

In the preferred embodiment, incoming serial video data from the handheld scanner (2) is converted into parallel video data prior to storage in the FIFO memory unit (13). Video data which corresponds to an entire scan line should have been stored in the memory unit (13) before the interrupt signal is generated to the computer so as to control the latter to retrieve said video data. The memory unit (13) continuously receives new video data from the handheld scanner (2) even as the computer retrieves the previous video data.

Referring once more to FIG. 3, if data is to be read from the FIFO memory unit (13) of the adapter system (1), a timing pulse must be provided thereto so as to control the memory unit (13) to point to the next byte of data to be read. [No timing pulse is required when writing data into the memory unit (13) since this is generated by the adapter system (1)]. The adapter system (1) does not incorporate any hardware which is capable of generating this timing pulse, and thus, a computer program is provided so as to control the computer to generate said timing pulse.

In the preferred embodiment, the DB2 pin of the printer port is used to provide the timing pulse to the FIFO memory unit (13). The computer program controls the computer to write alternatingly a series of logic 1 and logic 0 signals at the DB2 pin, thereby generating the required timing pulses.

When a logic 0 signal is present at the DB2 pin, the FIFO memory unit (13) provides an 8-bit video data to the data latch buffer (14). The data latch buffer (14) includes a tri-state buffer (74LS241) which requires two independent enable signals so as to transmit four bits of the video data at one time via the printer control bus, which includes the/ STROBE, AUTO FD XT, INIT and/SLCT IN pins, or the printer status bus, which includes the/ERROR, SLCT, PE and BUSY pins. The enable signals are generated at the DB3 and DB4 pins of the printer port. DB3 and DB4 are both at a high logic state if the front part of the video data is to be read by the computer and are both at a low logic state if the latter part of the video data is to be read. DB3= 0 and DB4=1 if no data is to be read from the adapter system (1).

It has thus been shown that the adapter system (1) of the present invention can be used to interface a conventional handheld scanner to the parallel printer port of a conventional portable computer without the need for modifying the hardware configuration of the handheld scanner and/or the portable computer.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An adapter system for interfacing a handheld scanner to a parallel printer port of a portable computer, the parallel printer port having a unidirectional data bus and a printer control and status bus, said adapter system comprising:

a data buffer for receiving serial video data and scanner controller signals from said handheld scanner and converting said serial video data into parallel video data;

a scanner resolution latch coupled to said data buffer, said scanner resolution latch receiving scanner controller signals from said data buffer, latching scanning resolution data from the scanner controller signals, and providing the scanning resolution data to said printer control and status bus of the parallel printer port;

a memory unit coupled to said data buffer, said memory unit receiving and storing said parallel video data from said data buffer;

a data latch buffer coupled to said memors, unit, said data latch buffer receiving said parallel video data from said memory unit and providing said parallel video data to said printer control and status bus of the parallel printer port; and a memory controller coupled between the data buffer and the memory unit, said memory controller receiving said scanner controller signals from the data buffer and generating write signals to said memory unit so as to enable said memory unit to store said parallel video data therein, said memory controller further coupled to said printer control and status bus of the parallel printer port and generating an interrupt signal and providing the interrupt signal to said printer control and status bus so as to inform said computer that video data is available when a predetermined quantity of said parallel video data has been stored in said memory unit.

2. An adapter system for interfacing a handheld scanner to a portable computer lacking a bidirectional parallel data port, the portable computer having a parallel printer port that includes a unidirectional data bus and a printer control and status bus, the adapter system comprising:

(a) a data buffer for receiving serial video data and scanner controller signals from the handheld scanner and converting the serial video data into parallel video data;

(b) a scanner resolution latch coupled to said data buffer, said scanner resolution latch receiving scanner controller signals from the data buffer, latching scanning resolution data from the scanner controller signals, and providing the scanning resolution data to the printer control and status bus of the parallel printer port;

(c) a memory unit coupled to said data buffer, said memory unit receiving and storing the parallel video data from the data buffer;

(d) a data latch buffer coupled to said memory unit, said data latch buffer receiving the parallel video data from the memory unit and providing the parallel video data to the printer control and status bus of the parallel printer port; and (e) a memory controller coupled between the data buffer and the memory unit, said memory controller receiving the scanner controller signals from the data buffer and generating write signals to the memory unit so as to enable the memory unit to store the parallel video data therein, said memory controller further coupled to the printer control and status bus of the parallel printer port and generating an interrupt signal and providing the interrupt signal to the printer control and status bus so as to inform the computer that video data is available when a predetermined quantity of the parallel video data has been stored in the memory unit.

3. The adapter system of claim 2, further comprising a power generating circuit for supplying power to the adapter system and to the handheld scanner.

4. The adapter system of claim 2, further comprising a computer program that is executed by the portable computer interfaced by the adapter system to the handheld scanner, the computer program causing the portable computer to generate a reset signal at the data bus so as to reset the adapter system when the portable computer is activated, said computer program further causing the portable computer to generate a disable signal at the data bus so as to disable the power generating circuit when the handheld scanner is not in use.

5. The adapter system of claim 2, wherein said scanner resolution latch provides scanning resolution data at a printer enable (PE) pin and a select (SLCT) pin of the printer control and status bus.

6. The adapter system of claim 2, wherein said memory controller generates the interrupt signal at an acknowledge (ACK) pin of the printer control and status bus.

7. The adapter system of claim 2, wherein said predetermined quantity of the parallel video data equals at least one scan line of the parallel video data.

8. An adapter for transmitting serial data from a handheld scanner to a host computer lacking a bidirectional parallel data port, the host computer having a parallel printer port that includes unidirectional data lines and printer control and status lines, wherein the serial data is transferred in parallel through the printer control and status lines of the parallel printer port, the adapter comprising:

(a) a data buffer, coupled to the handheld scanner, for receiving serial data and timing signals indicative of the availability of serial data from the handheld scanner and for converting the serial data into parallel data;

(b) a scanner resolution latch coupled to the data buffer, said scanner resolution latch receiving scanner control signals from the data buffer, latching scanning resolution data from the scanner control signals, and providing the scanning resolution data to the printer control and status lines of the parallel printer port;

(c) a memory unit, coupled between the data buffer and the printer control and status lines of the parallel printer port, for receiving and storing the parallel data from the data buffer;

(d) a data latch coupled between the memory unit and the printer control and status lines of the parallel printer port, said data latch receiving parallel data from the memory unit and providing the parallel data to the printer control and status lines;

(e) a memory controller coupled to the data buffer and the memory unit, said memory controller receiving the timing signals from the data buffer and generating write signals to the memory unit to direct the memory unit to store parallel data, said memory controller further coupled to one of the printer control and status lines on the parallel port of the host computer, wherein the memory controller generates an interrupt signal on said one of the printer control and status lines when a predetermined quantity of parallel data has been stored in the memory unit to inform the host computer that parallel data is available, wherein upon receiving the interrupt signal the host computer generates a timing pulse to transfer the parallel data from the memory unit over the printer control and status lines to the host computer.

9. The adapter of claim 8, wherein the data latch formats the parallel data into two 4-bit words before providing the parallel data to the printer control and status lines.

10. The adapter of claim 8, wherein the scanner resolution latch provides the scanning resolution data on a primer enable (PE) line and a select (SLCT) line of the palmer control and status lines.

11. The adapter of claim 8, further comprising a computer program that is executed by the host computer connected to the handheld scanner by the adapter, the computer program causing the host computer to generate a reset signal on one of the data lines of the printer port so as to reset the adapter when the host computer is activated.

12. The adapter of claim 8, further comprising a power generating circuit for supplying power to the adapter.

13. The adapter of claim 12, wherein the power generating circuit also supplies power to the handheld scanner.

14. The adapter of claim 13, further comprising a computer program that is executed by the host computer connected to the handheld scanner by the adapter, the computer program causing the host computer to generate an enable signal on one of the data lines of the parallel printer port to enable the power generating circuit when the handheld scanner is to be used, the computer program also causing the host computer to generate a disable signal on one of the data lines of the parallel printer port to disable the power generating circuit when the handheld scanner is not in use.

15. The adapter of claim 8, wherein the memory controller generates the interrupt signal on an acknowledge (ACK) line of the primer control and status lines.

16. The adapter of claim 8, wherein the predetermined quantity of the parallel data equals at least one scan line of the serial data received from the handheld scanner.

* * * * *

UNITED STATES PATENT AND TRADEMARK OFFICE
CERTIFICATE OF CORRECTION

PATENT NO. : 5,490,283
DATED : February 6, 1996
INVENTOR(S) : R. Chin

It is certified that error appears in the above-indentified patent and that said Letters Patent is hereby corrected as shown below:

| [56] (pg. 1, col. 1) COLUMN | Refs. Cited U.S. Pat Docs. LINE | |
|---|---|---|
| 2 | 14 | "Tokui" should read --Tokui et al.-- Delete "." and insert --; and-- |
| 7 (Claim 8, | 59 line 16) | "scarming" should read --scanning-- |
| 8 (Claim 8, | 9 line 26) | After ";" insert --and-- |
| 8 (Claim 15, | 56 line 3) | "primer" should read --printer-- |

Signed and Sealed this

Ninth Day of July, 1996

Attest:

BRUCE LEHMAN

*Attesting Officer*    Commissioner of Patents and Trademarks